(12) United States Patent
Svensson

(10) Patent No.: US 9,276,458 B2
(45) Date of Patent: Mar. 1, 2016

(54) SWITCH CONTROL FOR CONTROLLING SWITCH ARRANGEMENTS OF A POWER CONVERTER BASED ON EFFICIENCY

(75) Inventor: Andreas Svensson, Tibro (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

(21) Appl. No.: 13/638,074

(22) PCT Filed: Apr. 1, 2010

(86) PCT No.: PCT/EP2010/054428
§ 371 (c)(1),
(2), (4) Date: Sep. 28, 2012

(87) PCT Pub. No.: WO2011/120586
PCT Pub. Date: Oct. 6, 2011

(65) Prior Publication Data
US 2013/0016532 A1    Jan. 17, 2013

(51) Int. Cl.
*G05F 1/00*     (2006.01)
*H02M 3/335*    (2006.01)
*H02M 1/38*     (2007.01)

(52) U.S. Cl.
CPC .......... *H02M 1/38* (2013.01); *H02M 3/33592* (2013.01); *Y02B 70/1475* (2013.01)

(58) Field of Classification Search
USPC ............... 363/15–17, 21.02, 21.03, 21.06; 323/266, 269, 272, 274, 275, 282–287
See application file for complete search history.

(56) References Cited

U.S. PATENT DOCUMENTS

| | | | |
|---|---|---|---|
| 6,617,306 B2* | 9/2003 | Stein et al. ..................... 514/1.2 |
| 6,940,738 B2* | 9/2005 | Huang et al. .................. 363/127 |
| 7,046,532 B2* | 5/2006 | Matsuo et al. .................. 363/65 |
| 7,110,269 B2* | 9/2006 | Cao et al. .................... 363/21.03 |
| 7,450,401 B2* | 11/2008 | Iida ................................. 363/16 |
| 2005/0281058 A1* | 12/2005 | Batarseh et al. ................ 363/16 |
| 2006/0113974 A1* | 6/2006 | Kan et al. ...................... 323/282 |
| 2007/0108040 A1* | 5/2007 | Elkin et al. .................... 204/176 |
| 2007/0145962 A1* | 6/2007 | Huang et al. .................. 323/283 |

(Continued)

OTHER PUBLICATIONS

Peterchev, et al., "Digital Loss-Minimizing Multi-Mode Synchronous Buck Converter Control", 35th Annual IEEE Power Electronic Specialists Conference, Jun. 20, 2004, vol. 5, pp. 3694-3699, XP010738304.

Yousefzadeh, et al., "Sensorless Optimization of Dead Times in DC-DC Converters with Synchronous Rectifiers", Applied Power Electronics Conference and Exposition, Mar. 2005, vol. 2, pp. 911-917, XP010809344.

*Primary Examiner* — Adolf Berhane
*Assistant Examiner* — Gary Nash
(74) *Attorney, Agent, or Firm* — Rothwell, Figg, Ernst & Manbeck P.C.

(57) ABSTRACT

The present invention relates to a power converter (1, 1') comprising an input terminal (+IN, −IN) connected to an input power source, at least an input switch arrangement (T1, T2; T10, T12), and an output terminal (+OUT, −OUT). The input switch arrangement (T1, T2; T10, T12) is arranged to convert the input power, where the power converter (1) further comprises a control unit (P1, N1) that is arranged to control at least the input switch arrangement (T1, T2; T10, T12). The control unit (P1, N1) is arranged to perform said control of the input switch arrangement (T1, T2; T10, T12) in dependence of the efficiency of at least a part of the power converter, the control unit (P1, N1) having information regarding the power at the input terminal (+IN, −IN) and the power at the output terminal (+OUT, −OUT). The present invention also relates to a corresponding method.

8 Claims, 5 Drawing Sheets

(56) References Cited

U.S. PATENT DOCUMENTS

2007/0230228 A1* 10/2007 Mao ............................ 363/89
2008/0055943 A1* 3/2008 Komiya ..................... 363/21.03
2008/0225563 A1 9/2008 Seo
2009/0059622 A1* 3/2009 Shimada et al. ................ 363/17

* cited by examiner

SWITCH CONTROL FOR CONTROLLING SWITCH ARRANGEMENTS OF A POWER CONVERTER BASED ON EFFICIENCY

CROSS-REFERENCE TO RELATED APPLICATION

This application is a 35 U.S.C. §371 National Phase Entry Application from PCT/EP2010/054428, filed Apr. 1, 2010, and designating the United States, the disclosure of which is incorporated by reference herein.

TECHNICAL FIELD

The present invention relates to a power converter comprising an input terminal connected to an input power source, at least an input switch arrangement, and an output terminal, the input switch arrangement being arranged to convert the input power, where the power converter further comprises a control unit that is arranged to control at least the input switch arrangement.

The present invention also relates to a method for controlling dead times in a power converter having an input terminal and an output terminal the method comprising the step of converting input power using an input switch arrangement.

BACKGROUND

Different types of power converters are normally used for providing power to electronic circuits, often these power converters are placed on circuit boards.

A typical power converter comprises switching elements which are controlled by a Pulse Width Modulator (PWM) that delivers the right dv/dt that determines the voltage that needs to be rectified. Rectification is used to be done with diodes, but due to a relatively high voltage drop, diodes are often replaced with rectification elements consisting of transistors, using a rectifying technique called synchronous rectification, where the transistors exhibit much lower voltage drop and thus cutting down power loss.

Power converters which are controlled by a PWM have traditionally been analogue, but are now being digitally controlled to a larger extent.

The transistors in a synchronous rectification need to be controlled in a precise manner so they conduct in the right moment. Otherwise large conduction losses are expected with RF and EMI problems. Problems that need to be accounted are cross conduction and body diode conduction.

Today, a technique with dead times to prevent this scenario is used, but the dead times must be adjustable against load, temperature, input and output voltage, component deviations and aging. In real life, a compromise is used by adding more power loss than optimum to be able to cover all these circumstances. Strictly theoretically, dead times should not be necessary, but, as the skilled person is well aware of, dead times are practically necessary for the function of PWM power converters which are PWM controlled with synchronously controlled switch elements.

In order to optimize the dead time, it must be changed in accordance to the variations mentioned above. This is possible in analogue circuits, but hard to realize as it add a lot of cost and complexity with no commercial interest.

There are no overall solutions today for optimizing the dead times. Analogue solutions for the whole problem are not cost effective or feasible in industrializations.

There is thus a need for a more optimization of dead times in power converters.

SUMMARY

The object of the present invention is to provide optimization of dead times in power converters.

This object is obtained by means of a power converter comprising an input terminal connected to an input power source, at least an input switch arrangement, and an output terminal. The input switch arrangement is arranged to convert the input power, where the power converter further comprises a control unit that is arranged to control at least the input switch arrangement. The control unit is arranged to perform said control of the input switch arrangement in dependence of the efficiency of at least a part of the power converter, the control unit having information regarding the power at the input terminal and the power at the output terminal.

This object is also obtained by means of a method for controlling dead times in a power converter having an input terminal and an output terminal the method comprising the step of converting input power using an input switch arrangement. The method further comprises the step of using information regarding the power at the input terminal and the power at the output terminal to control said input switch arrangement in dependence of the efficiency of the power converter.

According to an example, the control unit comprises means for detecting the power at the input terminal or at both the input terminal and the output terminal.

According to another example, the power converter further comprises an inductor that is arranged to store power during a first time period and to release power during a second time period.

According to another example, the power converter further comprises an output switch arrangement, where the control unit is arranged to perform control of both the input switch arrangement and the output switch arrangement in dependence of the efficiency of at least a part the power converter.

According to another example, the power converter further comprises a primary section, a secondary section and a transformer, where the primary section comprises the input terminal which is connected to a DC input power source, the primary section also comprising the input switch arrangement, and where the secondary section comprises the output terminal.

Other examples are evident from the dependent claims.

A number of advantages are obtained by means of the present invention. For example:

- A maximum efficiency can be realized at any condition mentioned.
- Best efficiency can be obtained at any load, voltage, normal component deviation or temperature condition.
- Lower component cost as component deviation can be trimmed automatically.
- Higher efficiency without adding more complexity to the power train.
- Lowers cost of ownership by lowering the energy cost.
- Demand on cooling is less due to less power loss.
- More reliable system due to lower operation temperature.
- Smaller footprint due to higher efficiency.

BRIEF DESCRIPTION OF THE DRAWINGS

The present invention will now be described more in detail with reference to the appended drawings, where.

DETAILED DESCRIPTION

In the following a number of examples will be presented, the first example being related to a power converter of the type DC/DC converter.

Battery backup is sometimes desired for electronic equipment is a system, having a system voltage. The battery power has to be converted to the correct system voltage, and conversion of the battery power to system voltage is usually done with the help of a DC/DC converter that converts the DC system voltage to a high frequency AC that is transformed to a new AC voltage level and then rectified to a new DC voltage level. The reason for this is to maintain efficiency and in some cases put a galvanic isolation or changing polarity from incoming DC network.

Figure 1:
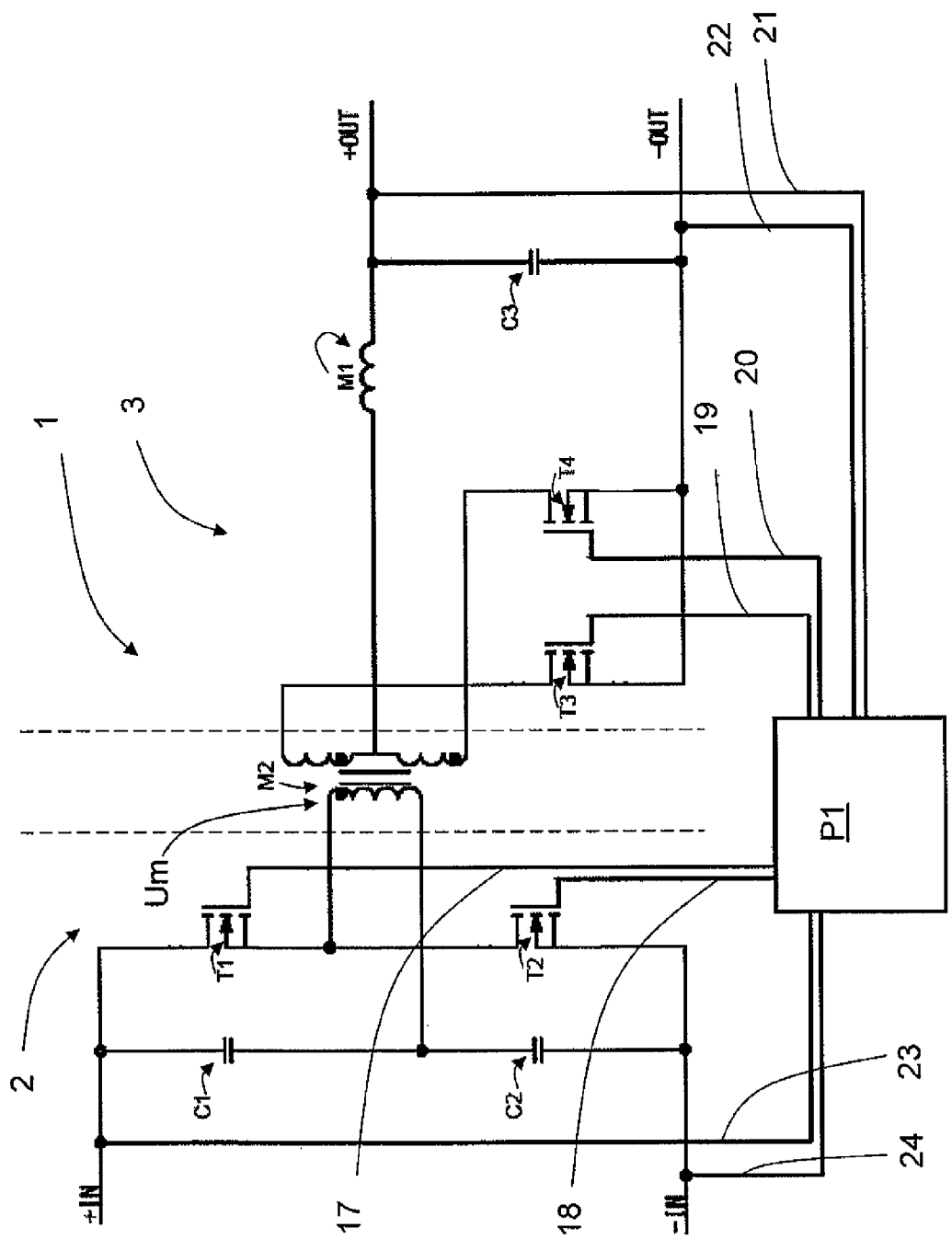
FIG. 1 shows a power converter according to a first example.

With reference to FIG. 1, a DC/DC converter 1 comprises a primary section 2, a secondary section 3 and a transformer M2, where the transformer M2 has a primary side and a secondary side and separates the primary section 2 from the secondary section 3 as denoted with dashed lines in FIG. 1.

The primary section 2 comprises an input terminal +IN, −IN having a first end +IN and a second end −IN, which terminal +IN, −IN is connected to an input power source. The input terminal +IN, −IN is further connected to a first input switch transistor T1 and a second input switch transistor T2, the input switch transistors T1, T2 constituting an input switch arrangement that is connected between the ends of the input terminal +IN, −IN.

The first input switch transistor T1 is connected in series with the second input switch transistor T2, and between them there is a connection to a first end of the primary side of the transformer M2.

The primary section 2 also comprises a first capacitor C1 and a second capacitor C2, which capacitors are connected in series with each other and in parallel with respect to the input switch transistors T1, T2. Between the capacitors C1, C2 there is a connection to a second end of the primary side of the transformer M2.

The secondary section 3 comprises an output terminal +OUT, −OUT having a first end +OUT and a second end −OUT, end where a third capacitor C3 is connected between said ends +OUT, −OUT. A first output switch transistor T3 is connected to a the end of the secondary side of the transformer M2, and a second output switch transistor T4 is connected to a second end of the secondary side of the transformer M2. The output switch transistors T3, T4 constitute an output switch arrangement and are connected to the second end −OUT of the output terminal.

An intermediate end of the of the secondary side of the transformer M2 is connected to an inductor M1, which in turn is connected to the first end +OUT of the output terminal.

The power converter 1 further comprises a control unit P1 that is connected to the input switch arrangement T1, T2 via corresponding connections 17, 18 and the output switch arrangement T3, T4 via corresponding connections 19, 20, the control unit P1 being arranged to control the input switch arrangement T1, T2 and the output switch arrangement T3, T4.

Figure 2:
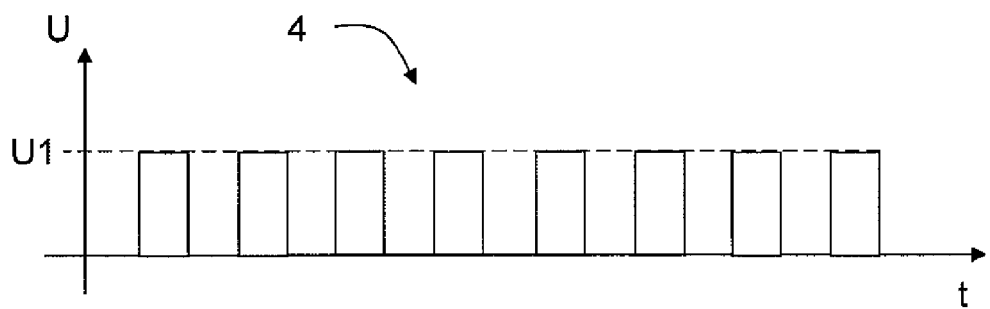
FIG. 2 shows a first AC pulse train.
Figure 3:
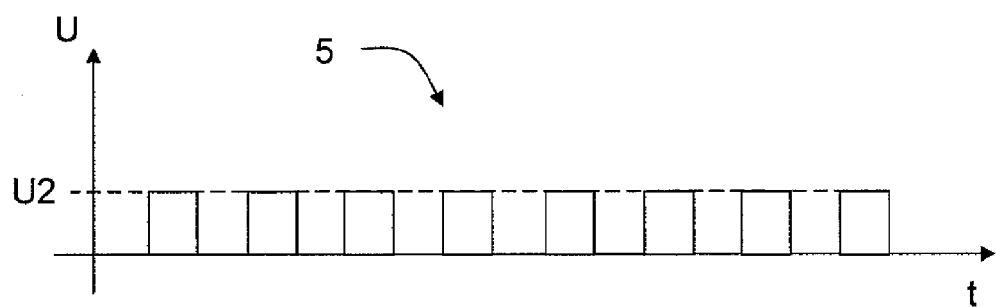
FIG. 3 shows a second AC pulse train.

With reference also to FIG. 2 and FIG. 3, the input switch arrangement T1, T2 is arranged to convert the DC input voltage to a first AC voltage 4, the transformer M2 is arranged to transform the first AC voltage 4 to a second AC voltage 5, and the output switch arrangement T3, T4 is arranged to convert the second AC voltage 5 to an output DC voltage at the output terminal +OUT, −OUT.

Figure 4:
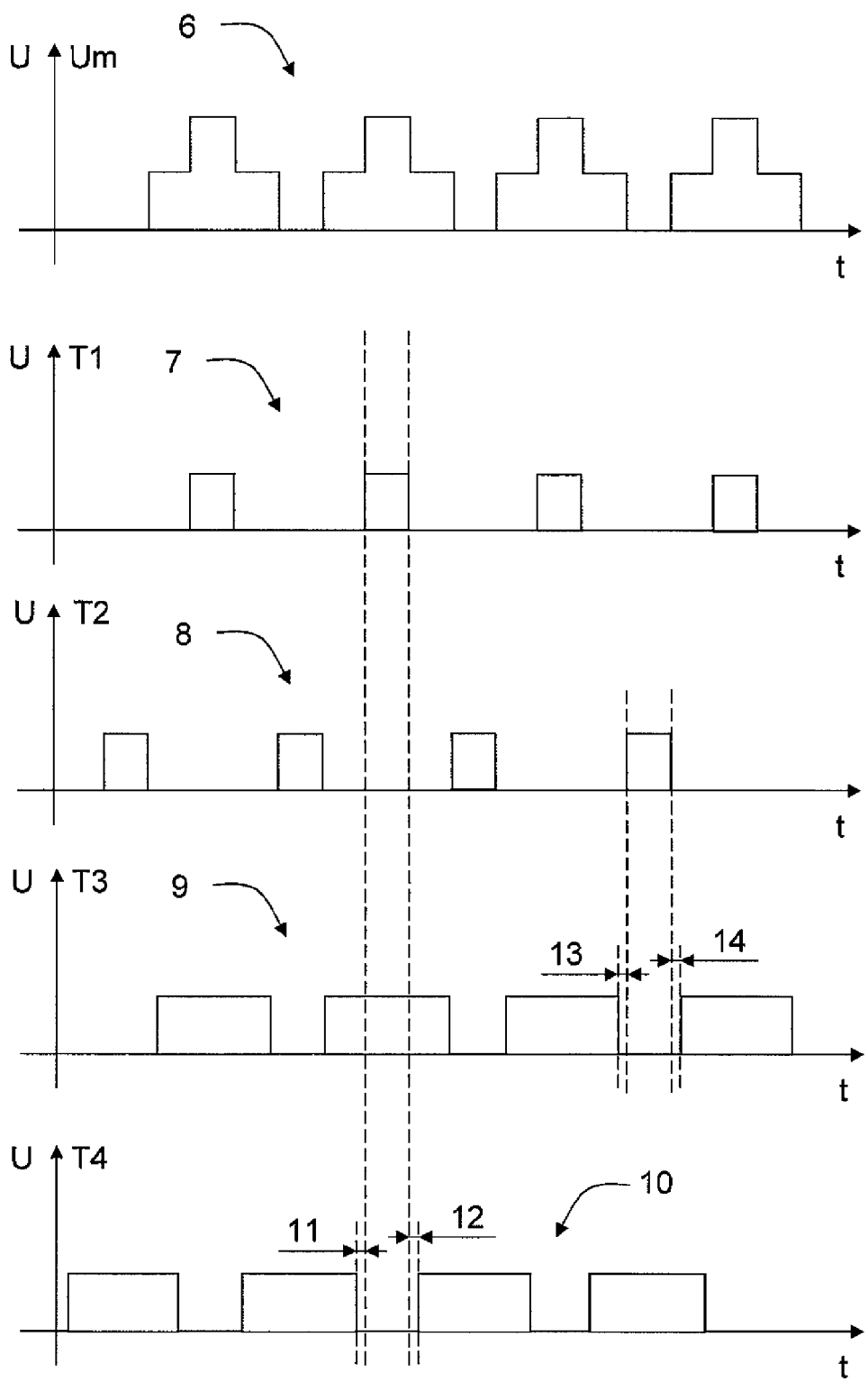
FIG. 4 shows control pulses for switch arrangements according FIG. 1 and the voltage at an end of the transformer's primary side.

With reference to FIG. 4, a first pulse train 6 shows a voltage Um at the first end of the primary side of the transformer M2. A second pulse train 7 shows the control pulses for the first input switch transistor T1, a third pulse train 8 shows the control pulses for the second input switch transistor T2, a fourth pulse train 9 shows the control pulses for the first output switch transistor T3 and a fifth pulse train 10 shows the control pulses for the second output switch transistor T4.

In the fifth pulse train 10 dead times 11, 12 are denoted with dashed lines, the dead times 11, 12 preventing the first input switch transistor T1 and the second output switch transistor T4 to be conducting at the same time. In the same way, in the fourth pulse train 9, dead times 13, 14 are denoted with dashed lines, the dead times 13, 14 preventing the second input switch transistor T2 and the first output switch transistor T3 to be conducting at the same time.

According to the present invention, the control unit P1 is arranged to control the input switch arrangement T1, T2 and the output switch arrangement T3, T4 in dependence of the efficiency of the power converter, the control unit P1 having information regarding the power at the input terminal +IN, −IN and the power at the output terminal +OUT, −OUT. In this way, the control unit P1 may control the switch arrangements T1, T2; T3, T4 in such a way that the efficiency is optimized or such that the losses are reduced, and thus such that the dead times are optimized for obtaining the desired result.

In order to obtain information regarding the power at the input terminal +IN, −IN and the power at the output terminal +OUT, −OUT, the control unit P1 comprises means for detecting the power at both the input terminal +IN, −IN and the output terminal +OUT, −OUT, and is, as shown in FIG. 1, connected to the input terminal +IN, −IN via corresponding connections 21, 22 and to the output terminal +OUT, −OUT via corresponding connections 23, 24.

Figure 5:
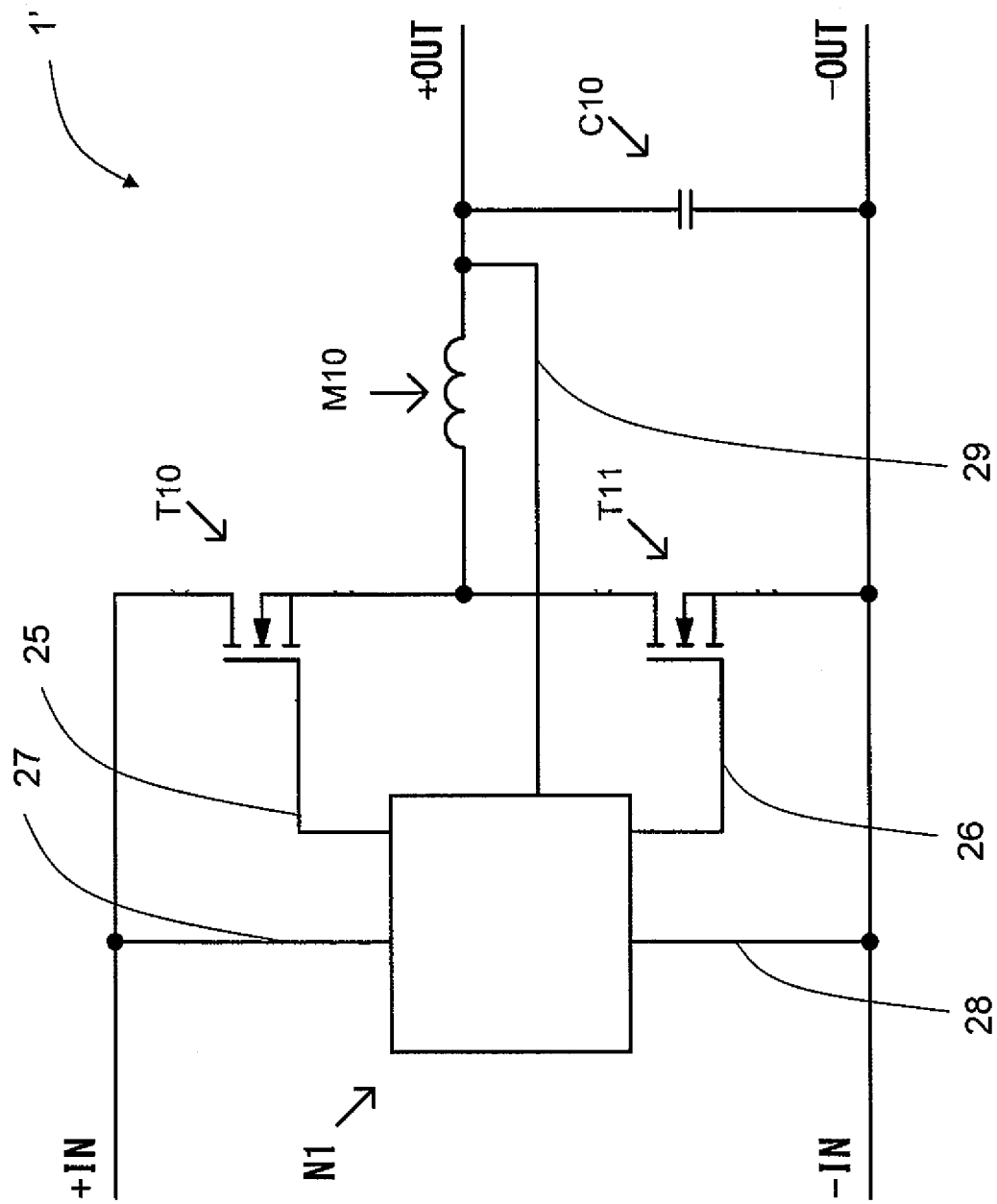
FIG. 5 shows a power converter according to a second example.

The present invention is not limited to the DC/DC converter described above, but may be use for any type of switched power converter. In FIG. 5, a Buck converter 1' is shown, having an input terminal +IN, −IN having a first end +IN and a second end −IN, and an output terminal +OUT, −OUT having a first end +OUT and a second end −OUT in the same way as the power converter shown in FIG. 1. The first end +IN is connected to a first input switch transistor T10 and the second end −IN is connected to a second input switch transistor T11.

The first input switch transistor T10 is connected in series with the second input switch transistor T11, and between them there is a connection to an inductor M10, which in turn is connected to the first end +OUT of the output terminal. Furthermore, the second end −IN of the input terminal is connected to the second end −OUT of the output terminal. The input switch transistors T10, T11 constitute an input switch arrangement. A capacitor C10 is connected between the first end +OUT and the second end −OUT of the output terminal +OUT, −OUT.

The Buck converter 1' further comprises a control unit N1 which is connected to the input switch arrangement T10, T11 via corresponding connections 25, 26 and is arranged to control the input switch arrangement T10, T11 in dependence of the efficiency of the power converter, the control unit N1 having information regarding the power at the input terminal +IN, −IN and the power at the output terminal +OUT, −OUT.

In order to obtain information regarding the power at the input terminal +IN, −IN and the power at the output terminal +OUT, −OUT, the control unit P1 comprises means for detecting the power at both the input terminal +IN, −IN and the output terminal +OUT, −OUT, and is, as shown in FIG. 5, connected to the input terminal +IN, −IN via corresponding connections 27, 28 and to the output terminal +OUT, −OUT via corresponding connections 29, 28.

In the examples presented, the inductor M1, M10 is arranged to store power during a first time period and to release power during a second time period.

In the examples presented, the capacitors C3, C10 that are connected over the corresponding output terminals are used to store power at the moments when the inductor/transformer M1, M2/M2 does not deliver power, and thus strives to maintain a DC voltage.

Figure 6:
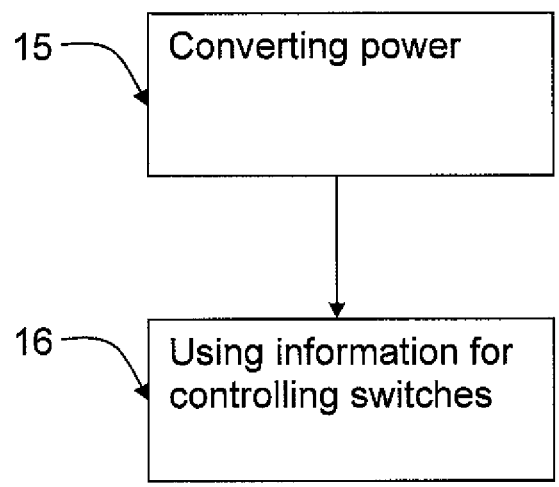
FIG. 6 shows a flow chart for a method according to the present invention.

With reference to FIG. 6, the present invention also relates to a method for controlling dead times in a power converter 1 having an input terminal +IN, −IN and an output terminal +OUT, −OUT, the method comprising the following steps:

15: converting input power using an input switch arrangement T1, T2; and

16: using information regarding the power at the input terminal +IN, −IN and the power at the output terminal +OUT, −OUT to control said input switch arrangement T1, T2 in dependence of the efficiency of the power converter.

The present invention is not limited to the embodiments shown above, but may vary freely within the scope of the appended claims. For example, the information regarding the power at the input terminal +IN, −IN and the power at the output terminal +OUT, −OUT may at least partly be obtained by means of an estimation or look-up tables in the control unit P1, N1, and may thus not have to be measured.

Furthermore, the control unit P1, N1 may control the related switch arrangements in dependence of the efficiency of at least a part of the power converter, and thus not necessarily the efficiency of the whole power converter.

When the power is measured at either the input terminal +IN, −IN, the output terminal +OUT, −OUT or both, it may be measured as for example voltage, current, electromagnetic field or heat. Hall sensors may be used as detectors where applicable.

As illustrated in the examples above, there does not have to be a transformer or an output switch arrangement, it all depends on the type of power converter used. The power converters shown and the components used are only disclosed as examples, showing the principles behind the present invention. For example, for a DC/DC transformer, it is not necessary to store power in an inductor at the secondary side.

Furthermore, there is a multitude of basic topologies regarding power converters regarding for example halfbridge and full bridge converters, and topologies with voltage dividers on the primary side and/or the secondary side. All these different topologies are well-known in the art.

More in general, the present invention is applicable for all power converters with at least one switch arrangement having dead times, for example varieties of the following:

Flyback, Boost, Buck Boost, Boost Buck (Cuk converter), Forward half bridge, Full bridge, Push pull, Two transistors forward and Flyforward.

There should be at least an input switch arrangement. The switches do not have to be in the form of transistors, but any type of appropriate switch components may be used.

Although the pulses have been shown as rectangular or square, any suitable pulse form is of course conceivable, such as for example triangular or rounded.

The invention claimed is:

1. A buck power converter comprising:
   an input terminal connected to an input power source and having a first input end and a second input end;
   an input switch arrangement comprising a first input switch and a second input switch, wherein the first input switch is connected to the first input end and the second input switch is connected to the second input end;
   an output terminal having a first output end and a second output end, wherein the second input end of the input terminal is connected to the second output end of the output terminal;
   an inductor that connects the first output end and a point between the first input switch and the second input switch;
   a control unit arranged to optimize a dead time in which neither the first input switch or the second input switch is conducting, by turning on and turning off of the input switch arrangement based on a power measured at the input terminal and a power measured at the output terminal; and
   one or more hall sensors in communication with the control unit and configured to measure power at the input terminal and to measure power at the output terminal.

2. The buck power converter according to claim 1, wherein the inductor is arranged to store energy during a first time period and to release energy during a second time period.

3. The buck power converter of claim 2, wherein the buck power converter is configured to convert a first DC voltage to a second DC voltage.

4. The buck power converter of claim 3, further comprising a capacitor between the first output end and the second output end.

5. The buck power converter of claim 4, wherein the control unit is arranged to control the input switch arrangement based on an efficiency of part of the buck power converter, and not an efficiency of the whole buck power converter.

6. The buck power converter of claim 5, wherein the one or more hall sensors are configured to measure an electromagnetic field at the input terminal or at the output terminal.

7. A method for controlling dead times in a buck power converter having an input terminal and an output terminal, the method comprising:
   converting input power using an input switch arrangement having a first input switch and a second input switch;
   using one or more hall sensors to measure power at the input terminal and to measure power at the output terminal; and
   optimizing a dead time in which neither the first input switch or the second input switch is conducting, by turning on and turning off of said input switch arrangement based on a power measured at the input terminal and a power measured at the output terminal, wherein
   the input terminal has a first input end and a second input end,
   the first input switch is connected to the first input end and the second input switch is connected to the second input end, the output terminal has a first output end and a second output end, wherein the second input end of the input terminal is connected to the second output end of the output terminal, and an inductor connects the first output end to a point between the first input switch and the second input switch.

8. The method according to claim 7, wherein the inductor is used to store energy during a first time period and to release energy during a second time period.

* * * * *

UNITED STATES PATENT AND TRADEMARK OFFICE
CERTIFICATE OF CORRECTION

| | |
|---|---|
| PATENT NO. | : 9,276,458 B2 |
| APPLICATION NO. | : 13/638074 |
| DATED | : March 1, 2016 |
| INVENTOR(S) | : Svensson |

It is certified that error appears in the above-identified patent and that said Letters Patent is hereby corrected as shown below:

On the Title Page, in Item (74), under "Attorney, Agent, or Firm", in Column 2, Line 2, delete "Manbeck" and insert -- Manbeck, --, therefor.

Signed and Sealed this
Seventh Day of June, 2016

Michelle K. Lee
*Director of the United States Patent and Trademark Office*